Dec. 24, 1929.  A. READ  1,740,748
AUTOMATIC HOSE REEL AND PROTECTOR
Filed Oct. 25, 1927  3 Sheets-Sheet 1

INVENTOR
ARTHUR READ.
BY Horace Barnes
ATTORNEY

Dec. 24, 1929.   A. READ   1,740,748
AUTOMATIC HOSE REEL AND PROTECTOR
Filed Oct. 25, 1927   3 Sheets-Sheet 2

INVENTOR
BY  Arthur Read
Horace Barnes
ATTORNEY

INVENTOR
BY ARTHUR READ
Horace Barnes,
ATTORNEY

Patented Dec. 24, 1929

1,740,748

UNITED STATES PATENT OFFICE

ARTHUR READ, OF PORTLAND, OREGON

AUTOMATIC HOSE REEL AND PROTECTOR

Application filed October 25, 1927. Serial No. 228,592.

This invention relates to improvements in apparatus for protecting hose for water or air supply in automobile service stations.

The principal object of my invention is to provide protection against damage caused by freezing temperatures and consequent uninterrupted utility of the hoses commonly used for compressed air and water as flexible conductors of these supplies between the rigid stationary standpipes constituting the dispensing station and the part of the automobile through which these fluids are injected.

A further object of the invention is the supply of power necessary for the automatic physical disposition of the said hoses within protective devices and locations, thus providing for comfortable and unfettered manipulation of the hoses.

A still further object of the invention is to provide automatic means for reeling and storing hose within a weather-proof compartment whereby the hose is protected from damage and preserved from undue deterioration from the elements.

A still further object of the invention is the preservation of the hoses in a clean condition and to render the use of the services possible and convenient with the handling only of the respective valves and suitable control devices not liable to becoming foul.

A further object is the provision of durable and dependable working parts easy of access for repairs.

Other objects are apparent in the following description of the selected form of apparatus which comprises a typical embodiment of my invention, in which.

Figures 1, 2:
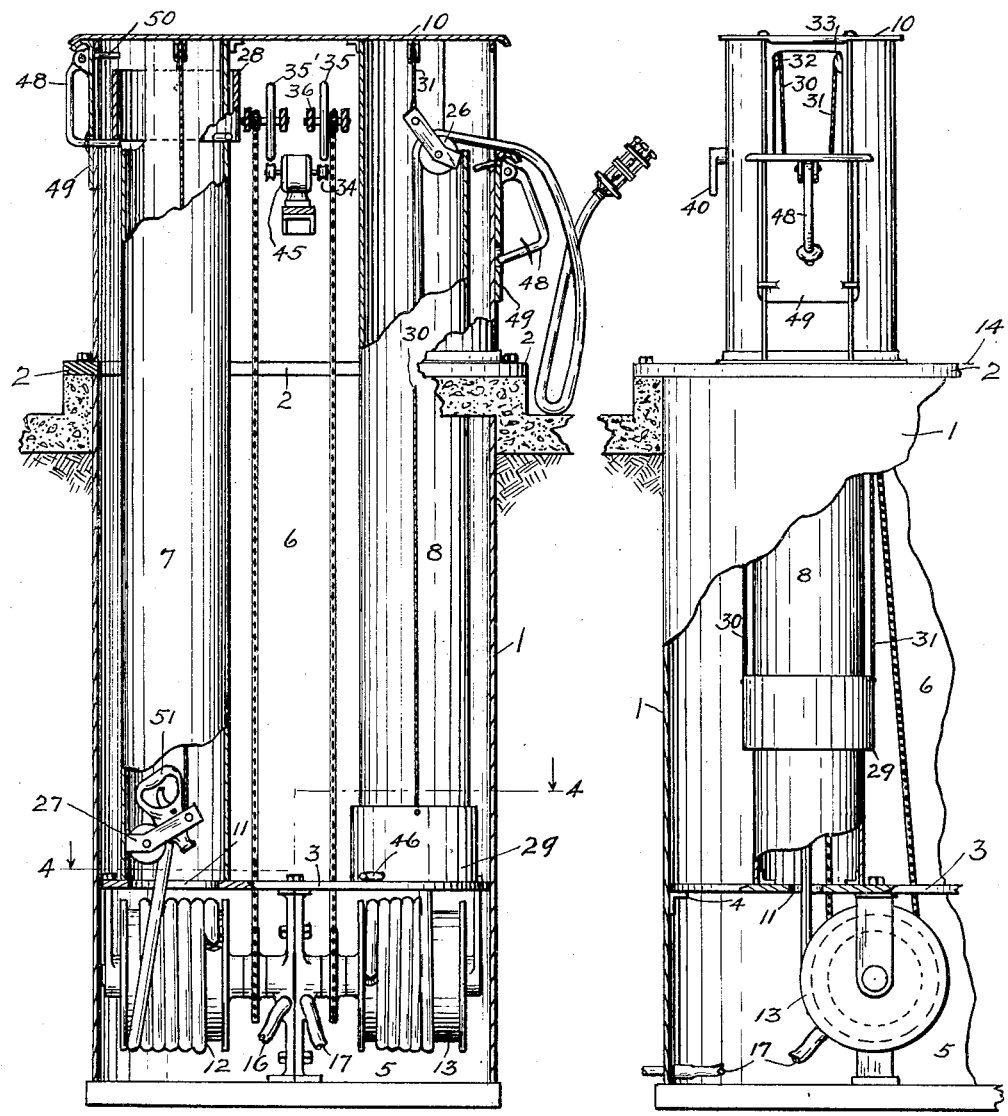
Figure 1 is a view in vertical section of apparatus embodying my invention.
Fig. 2 is a side view of the same, shown partly in section and partly in elevation.
Figure 3:
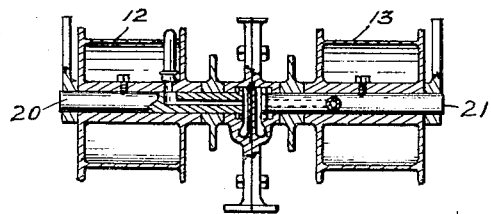
Fig. 3 is a view in axial vertical section through the hose reels and co-operative parts.

Referring to said views, the reference numeral 1 indicates a shell or casing in which the entire mechanism and hoses, when not in use, are encased and stored, respectively. This shell 1 is provided with an annular bracket 2 serving to support the whole machine upon the foundation in which the machine is installed. This annular bracket is attached to the shell at such an elevation as to provide for the protrusion from the ground of a convenient portion of the shell with reference to its utility, the lower part of the shell being sunk into the ground for a distance depending upon the depth to which the ground freezes.

A horizontally disposed plate 3 is supported upon brackets 4 and dividing the shell into a lower chamber 5 and an upper chamber 6. Tubes 7 and 8 are rigidly mounted in the plate 3 extending vertically to a rigid connection with the upper wall 10 of the casing. Said tubes communicate by openings 11 with the lower chamber 5.

From the lower side of the plate 3 two hose reels 12 and 13 are suspended together with their co-operating parts. The whole of this mechanism, comprising that part of the shell 1 upward from a level indicated at 100

14, the tubes 7 and 8, baffle plate 3, hose reels 12 and 13 and connected parts, and driving mechanism 15, are removable from the well lined by the lower part of the shell 1 which remains permanently in the ground.

Figure 4:
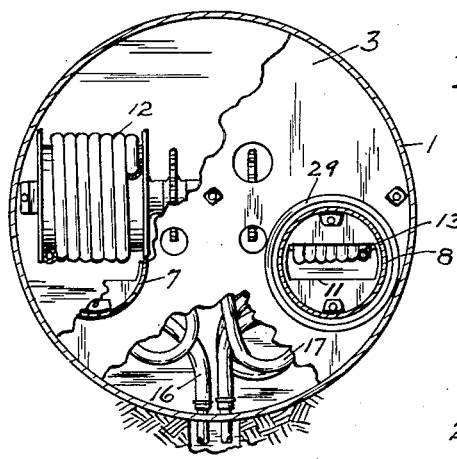
Fig. 4 is a horizontal sectional view on line 4—4 of Fig. 1.

Connection of this removable unit with the sources of supply of compressed air and water is effected by interposed lengths of flexible pipe 16 and 17 (Fig. 4), long enough to permit of the easy and convenient removal of the said removable unit.

Figure 8:
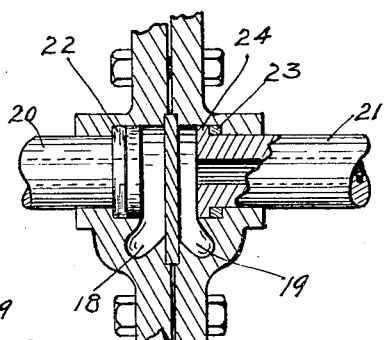
Fig. 8 is a detailed view of a central fragmentary vertical section of the devices serving to connect the revolving and stationary pipes for compressed air and water and which constitute an automatic braking device.
Figure 5:
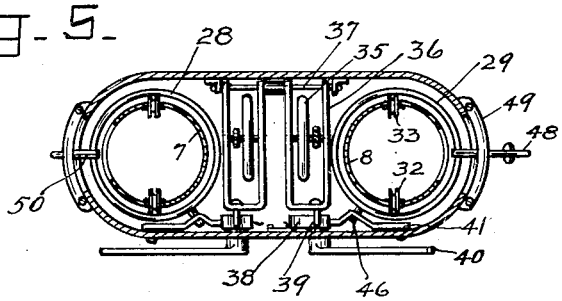
Fig. 5 is a horizontal sectional view on line 5—5 of Fig. 6.
Figure 6:
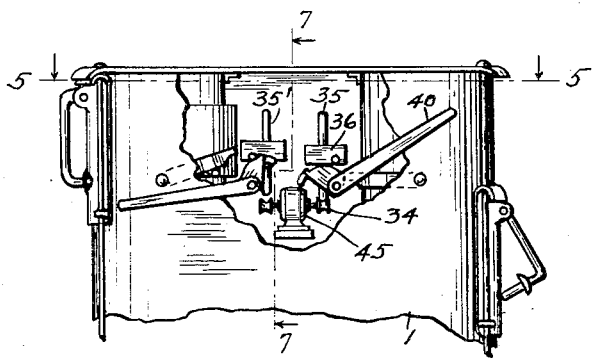
Fig. 6 is a view in side elevation of the upper part of the machine with part of the encasing shell broken away to reveal the motor, selective friction driving mechanism, and controls therefor.
Figure 7:
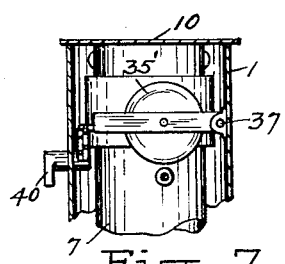
Fig. 7 is a view in vertical section on line 7—7 of Fig. 6.

In Fig. 8 the termini of the stationary portions of the conductor pipes (for compressed air and water) are indicated at 18 and 19. These chambers 18 and 19 are of cylindrical figure and communicate with the rotatable hollow shafts 20 and 21 which in turn conduct the fluids to the respective hoses supplied, and upon which are fixed the hose reels. Compressible packings 22 and 23, against which the flanges of the hollow shafts 20 and 21 are forced by the fluid pressures bearing thereupon, provide for the hermetical seal required at this point and the freedom of the shafts to rotate.

In reeling a flexible tube of circular section the section tends to assume an elliptical figure. If a fluid under pressure be supplied to such a coiled or reeled hose, the hose tends to regain its circular sectional figure and hence straighten itself. This action exerts a forced tending to unreel the hose in a manner similar to the unwinding of a clock spring.

The value of this unwinding force is dependent upon the pressure of the fluid in the hose, requiring for uniform resistance to unreeling a braking device serving to exactly counteract this effect. This is provided for by the braking effect produced by the friction of the annular shoulder 24 with the packing 23 against which it is forced by the fluid pressure contained.

The hoses serving the user thus contain compressed air and water under pressure at all times, suitable valves being attached at the free ends.

The manner of operation of either compressed air or water service is typical of the other. A movable pulley 26 provides for the fairleading of the hose when being drawn out for use. This pulley is further arranged to descend with the service valve, which cannot pass through the pulley, to a position similar to that shown at 27, and in the course of which a tubular counterweight as 28 (or 29) surrounding and guided upon the tubes 7 (or 8) is raised by two cords, as 30 and 31 (Fig. 2), attached thereto at places diametrically opposite, and passing through the two pulleys 32 and 33 and thence joined together and to the movable pulley 26.

A friction pulley 34 on the motor shaft drives the driven wheel 35 accordingly as it is lowered upon the motor pulley by the operation of the controlling mechanism. A chain and sprocket gear is employed to transmit the power from this driven wheel 35 (or 36) to the hose reel 12 (or 13).

The mechanism that serves to co-ordinate the operation of the driving apparatus with the required disposition of the service hose and enclosing door comprises: a yoke 36, hinged at one end 37 to allow of the elevation or depression of the wheel 35, by the operation of the cam 38 against the pin 39 fast to said yoke 36, the cam 38 and control lever 40 being fixed to a common shaft; a trigger 41 pivotally attached to the shell 1 and fitted to engage the shoulder 42 of the cam 38 so that the unit comprising the control lever 40 and cam 38, together with the connecting shaft, is held in the position shown by the broken lines; a contact point 43 attached to the shell, but insulated therefrom, together with a contactor 44 attached to the cam 38 and also insulated therefrom, constituting an electrical switch, connected electrically in series with the motor 45; a pin 46, protruding from and rigidly attached to the counterweight 29, serving to trip or raise the trigger 41 from its position of engagement with the cam 38; a control or latch handle 48 having upper and lower legs sufficiently long to engage the counterweight 29 pivotally attached to a vertically sliding door.

The operation of the machine is as follows:

A user approaching the machine finds it in the condition illustrated by the position of the parts of the left hand unit of Fig. 1, that is, the counterweight 28 is being supported by the lower leg of the latch handle 48, in turn supported by the shell of the machine 1, the door 49 being also attached to the latch handle is likewise supported in its upper position where it closes the opening through which the hose may be withdrawn.

Upon pulling the handle the lower leg thereof is withdrawn so that the counterweight and door are left unsupported. The door immediately descends by gravity until checked by the engagement of the upper leg of the latch handle 50 with the upper surface of the counterweight 28 which is also descending. The door and counterweight thus descend together until the door reaches its limit of travel. As the counterweight moves downward, the service hose is drawn upward by the movable pulley 26 connected to the counterweight 29 by the cords 30 and 31 rove through the stationary pulleys 32 and 33, respectively. The door thus having been gently lowered, the hand valve 51 of the service hose is soon presented just inside the opening in the shell 1 uncovered by the lowering of the door.

The user reaches through this opening and grasps the hand valve by which the hose is withdrawn for use, incidentally rove through the movable pulley which functions as a fair-leader.

Having finished with the service the user next raises the lever 40 which sets the mechanism in motion to stow the hose away below the frost line in the ground.

Figure 9:
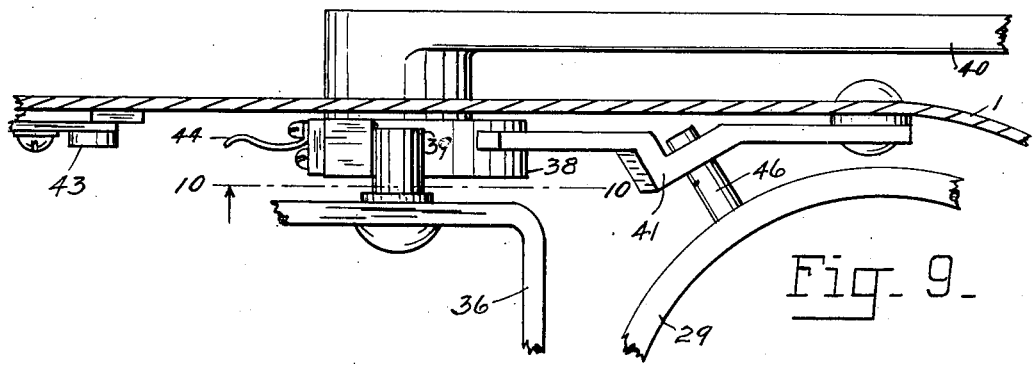
Fig. 9 is a detailed view of a fragmentary horizontal section of the controls and cooperating interlocking mechanism.
Figure 10:
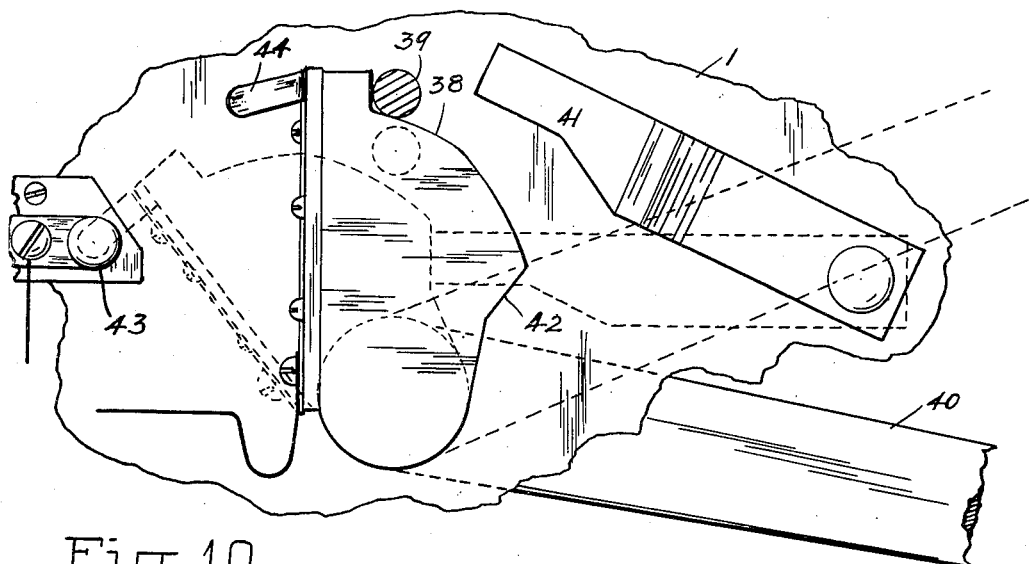
Fig. 10 is a view in fragmentary vertical section on line 10—10 of Fig. 9, in which two extreme positions of the working parts are indicated by the solid and broken lines, respectively.

Upon raising the free end of the lever 40 (Fig. 9) the cam 38 is moved into the position shown by the broken lines of Fig. 10, at which juncture the trigger 41 drops into engagement with the shoulder 42 of the cam 38, the electrical circuit connected to the motor 45, through the contact point 43 and contactor 44 is completed, and the yoke 36 is allowed to descend by gravity so that the driven wheel actuating the hose reel through the said chain and sprocket gear is brought into contact with the driving pulley of this motor.

The motor having been set in operation and the driving mechanism connected, the hose is reeled in until the hand valve becomes chock-a-block with the movable pulley 26. The continued reeling in of the hose results in the pulling downward of the movable pulley and consequent raising of the counterweight.

As the counterweight ascends the upper surface thereof engages the upper leg of the latch handle of the door, as 50. The latch handle being pivotally attached to the door, the lower leg is moved with considerable force inwardly against the shell of the machine, and continues to bear thereupon during the ascent of the door until the opening in the shell is reached, when the lower leg will be thrust inwardly to its extreme limit of motion.

Upon the further ascent of the counterweight, the pine 46 (Fig. 9) attached thereto raises the trigger 41. The free end of the relatively heavy control handle 40 descends and actuates the cam in a clockwise direction as shown in Fig. 10, resulting in the breaking of the electrical circuit, and the raising of the driven friction wheel out of engagement.

The door and counterweight will then settle downward and be supported by the lower leg of the latch handle as originally.

Figure 11:
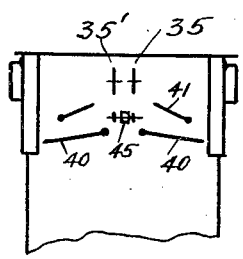
Figs. 11 and 12 are diagrammatic views respectively indicating the relative positions of the control devices in two typical phases of operation.
Figure 12:
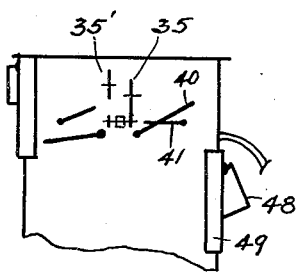

Figs. 11 and 12 are diagrams in which the relative positions of the control levers 40, the triggers 41, and the driven wheels 35 and 36 are shown during the times when the apparatus is not in use and when the right hand service hose is being stowed away, respectively.

Because of the fact that the reeling up or stowing mechanism of this station is not operative until the user desires it to be, the portion of hose that may be withdrawn to permit of reaching any point about the car will remain so withdrawn without effort on the part of the user. This greater convenience to the prospective customer for other commodities sold by the station owner will induce him to give preference to the station so equipped. This convenience in caring for a car will be in greater contrast to older methods especially in very cold weather when slight annoyances to a user may be exasperating and when this service might be exclusively available. Since the hand valve is the only part of the mechanism that need be held in the hand while being used the discomfort of handling metal pieces or other parts of high specific heat will be avoided as the hand valve is stowed away below the frost line in the ground while not in use and will not therefore have the tendency to "bite" the fingers upon contact therewith as is the case where these parts are exposed to the weather.

Having described my invention, what I claim, is:

1. In automatic power-driven hose-reeling apparatus, an automatic clutch disengaging and circuit-breaking device comprising a motor-actuated driving wheel, a friction-driven wheel engageable with said driving wheel, a cam serving to disengage said wheels, an electric switch having two contacting points one of which moves with said cam away from the other, a weighted lever arranged normally to actuate said cam to separate said wheels, and means to maintain said weighted lever in its elevated position during the actuation of the driven wheel.

2. In apparatus for service stations, a casing extending for part of its length below the ground level, a plate removably supported in said casing, a hose reel supported upon the under side of said plate, said reel having a water passage through its axis, a supply hose communicatively connected with a source of water supply and with said water passage in the reel, and a delivery hose connected to said passage and adapted to be coiled upon said reel, said plate and connected parts being removable as a unit from said casing.

3. In a service station, a casing having a door closure at one end and extending below the ground level at its other end, a hose reel mounted in the lower end of said casing, an electric motor to drive said reel, said reel including a conduit to supply fluid under pressure to a hose mounted therein, a counterweight in said casing attached to the nozzle end of said hose, and adapted when released to unwind said reel and present said nozzle to the door opening.

4. In a service station a casing, including a door at its upper end extending below the ground level to provide a chamber in which a flexible pipe is reeled, and means whereby the hose is unreeled and the nozzle end of said hose is elevated to the upper end of the casing when said door is opened.

5. In service stations, a casing extending at its lower end below the frost line in the ground, a hose reel therein, driving gear enmeshed with said hose reel and offering frictional resistance to motion thereof, a length of hose adapted to reeling, a counter-weight to overcome the friction of the entrained driving gear for said hose reel, means for attaching said counterweight to the free end of said hose, a manually controlled latch serving to support said counterweight when the machine is not in use, a vertically sliding door provided with lugs to engage the counterweight, and sustained at its upper or closed position by said latch.

6. In a service station, a casing extending at its lower end below the frost level of the ground and having a door opening at its upper end, a vertically slidable door closure for said opening having a manually controlled latch, a hose reel mounted at the lower end of the casing chamber, a hose on said reel, power actuated devices for reeling in said hose, and a counterweight to overcome the gravity of the free end of the hose and to elevate the same to the upper end of the casing, said door latch serving as a retaining device for said counterweight and to release the same when the door is opened.

7. In a service station, a casing, a hose reel at the lower end of said casing, a hose wound upon said reel, a counterweight connected to the nozzle-end of said hose and arranged to be releasably supported in the upper end of the casing, and means to release said counterweight and thereby unreeling the hose and carrying the nozzle-end of the hose to the upper end of the casing by the power of the descending counterweight.

8. In a service station, a casing, a removable plate adjacent the bottom of said casing, a hose reel secured to said plate and removable therewith, a hose upon said reel, and a counterweight flexibly connected to the nozzle-end of the hose arranged to be releasably secured at the upper end of the casing, and trip means to release said weight to unreel said hose and lift the nozzle-end thereof to the top of the casing.

9. In a service station, a casing, a hose reel positioned in the lower end of said casing, a hose wound upon said reel, a counterweight connected to the nozzle-end of the hose and arranged to be releasably supported in the upper end of the casing, means to release said weight and thereby unreel the hose and carry the nozzle-end to the upper portion of the casing, an electric motor, and operative connections between the motor and said reel to wind up the hose and thereby lift said weight to its elevated position.

10. In a service station, the structure set forth in claim 9, and wherein manually actuated switch devices are provided to energize said motor, together with means operated by the lifting of said weight to open said switch.

ARTHUR READ.